Figure 1:
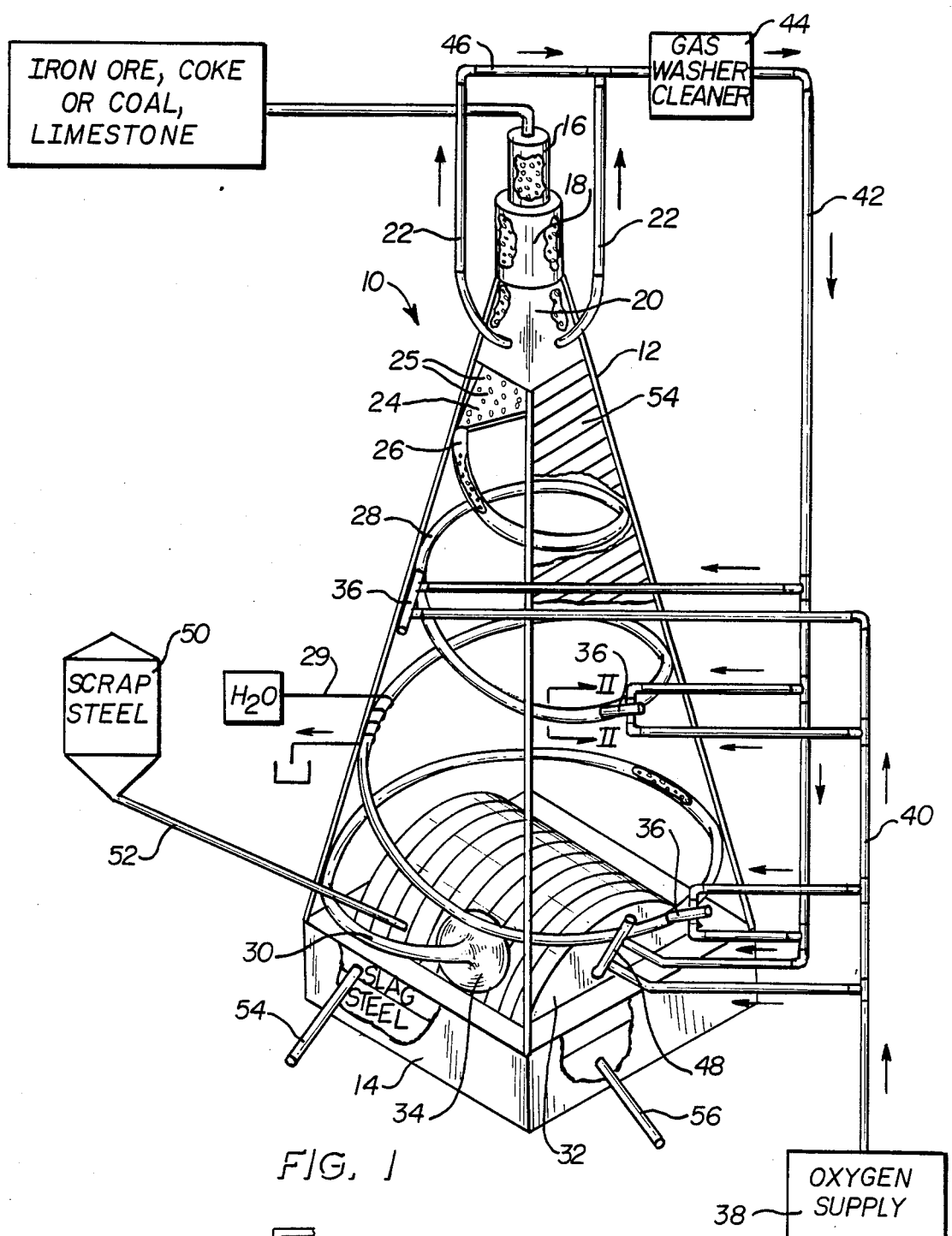

United States Patent [19]

Kelmar

[11] Patent Number: 4,978,106
[45] Date of Patent: Dec. 18, 1990

[54] IRON REDUCTION APPARATUS

[76] Inventor: John J. Kelmar, 2205 Cypress Dr., McKeesport, Pa. 15131

[21] Appl. No.: 385,688

[22] Filed: Jul. 27, 1989

[51] Int. Cl.$^5$ .............................................. F27B 9/16
[52] U.S. Cl. .................................... 266/177; 266/186; 75/443
[58] Field of Search ............... 266/176, 177, 181, 185, 266/186; 75/443

[56] References Cited

U.S. PATENT DOCUMENTS

| | | | |
|---|---|---|---|
| 748,561 | 12/1903 | Riveroll | 266/176 |
| 1,611,098 | 12/1926 | Borner . | |
| 1,767,779 | 6/1930 | Trent . | |
| 1,799,643 | 4/1931 | Rogers | 266/176 |
| 1,895,284 | 1/1933 | Hay . | |
| 3,164,380 | 1/1965 | Kus | 263/32 |
| 3,556,775 | 1/1971 | Kuratomi | 75/60 |
| 3,658,310 | 4/1972 | Spooner et al. | 266/24 |
| 4,324,391 | 4/1982 | Yamaguchi et al. | 266/200 |
| 4,670,049 | 6/1987 | Kelmar | 75/41 |

FOREIGN PATENT DOCUMENTS 998511 2/1983 U.S.S.R. ............................. 266/171

Primary Examiner—Melvyn J. Andrews
Attorney, Agent, or Firm—Carothers & Carothers

[57] ABSTRACT

A method and apparatus for reducing iron in a steelmaking process including a closed thermal transfer system in which a flow of process ingredients including iron ore is directed in a descending, preferably spiral path defined by a downwardly spiraling pipe with the process ingredients moving in countercurrent flow relation to a continuous flow of reducing gases ascending within the pipe to reduce the process ingredients to a continuously flowing stream of molten iron and slag which moves downwardly in the spiral pipe and into a hearth furnace.

10 Claims, 1 Drawing Sheet

U.S. Patent

Dec. 18, 1990

4,978,106

IRON REDUCTION APPARATUS

BACKGROUND OF THE INVENTION

In the steelmaking art it is well known to utilize conventional blast furnaces to produce molten iron for ultimate conversion to steel. It is also well known to make steel directly from iron ore and other process ingredients in a blast furnace from my prior U.S. Pat. Nos. 4,670,049 and 3,460,934.

The operation of the conventional blast furnace in making iron is well known. The furnace is charged from the top to form therein a column of iron ore, limestone and structural coke of sufficient strength to support the furnace charge to a depth of 90 to 100 feet. A hot air blast is forced through tuyeres at the bottom of the packed furnace to furnish heat and oxygen for the combustion of the coke in the furnace charge. The resulting gas passes up through the furnace shaft and reduce the ore, coke and flux to molten metal and slag, and then issues from the top of the furnace as dust-laden lean combustible gas. The column of process materials descends in the furnace shaft at a rate of about ten feet per hour as the structural coke is consumed, and molten iron and slag form a pool and separate in the bottom of the furnace. The pool is intermittently tapped to draw off the iron and slag separately.

It is also known in the prior art to utilize a furnace apparatus which directs the process ingredients through a tortuous path of travel. For example, my above mentioned U.S. Pat. No. 4,670,049 discloses a blast furnace for direct steelmaking in which process materials cascade as a continuous, free falling flow through a flow path that includes cascade step structures in the furnace shaft.

Additionally, U.S. Pat. No. 1,799,643 discloses a smelting furnace tower in which a radially inwardly open spiral flow channel is formed in the side walls of the tower and burner nozzles are arranged tangently to the spiral channel to direct gas and flame in a downward spiraling direction. The process ingredients are caught up by the swirling blast of flame and gases and therefore follow the downwardly spiraling channel.

U.S. Pat. No. 748,561 discloses a smelting furnace which incorporates an elongated declining smelting path with straight sections joined by sharp turns, and into which flame and gases are injected. U.S. Pat. No. 748,561 additionally discloses a furnace shaft with a varying cross section which tapers from a larger cross section adjacent the furnace entrance to a smaller cross section downstream therefrom, and breaker elements obstructing a portion of the process material flow path within the furnace chamber to retard movement of process ingredients toward the furnace outlet.

BRIEF SUMMARY OF THE INVENTION

The present invention contemplates a novel and improved method and apparatus for processing the conventional ingredients of steelmaking to produce reduced iron and slag from iron ore, coke or coal and limestone, and ultimately to refine the smelted iron to make steel. Specifically, the invention contemplates an upstanding apparatus supported preferably by a fabricated structural framework and comprising a downwardly spiraling pipe which constitutes a closed heat transfer system within which the process ingredients for iron reduction are smelted to produce molten iron and slag as they travel in a continuous stream from the top or inlet end of the spiral pipe to its lower or outlet end. Spaced along the length of the spiral pipe are tuyeres which direct a blast of burning oxygen and recycle gas in an upstream direction within the spiral pipe and thus in countercurrent flow relation to the direction of movement of the process materials as they descend through the pipe.

The spiral pipe preferably has a clear working diameter of approximately 36 inches and an overall length of approximately 240 feet. If these exact dimensions are utilized, the spiral pipe provides an effective working volume equivalent to 9579 cubic feet dynamic (i.e. under operating conditions) compared with the working volume for a conventional blast furnace of approximately 50,000 cubic feet. The apparatus is thus quite compact and well suited for use in specialty operations and mini-mills which have been recently gaining increasing acceptance due to their favorable economics.

The spiral form of the pipe structure according to my invention provides a uniform downward flow of the furnace charge materials to the hearth and the combustion zone of the furnace.

My invention thus permits iron reduction and steelmaking to be pursued as a continuous flow process on a relatively smaller scale than has been required for conventional blast furnace operations, including those which facilitate direct steelmaking processes. In addition, the reduced working volume of the apparatus greatly reduces the fuel demands of the reduction process and correspondingly improves fuel consumption economy. I have found from computer aided analysis of my invention that a system with the dimensions and other physical parameters as above specified provides a residence time of 29 minutes for each increment of process materials, and a production capacity of 3,650 tons of molten iron and slag per day.

It is therefore one object of the invention to provide a novel and improved iron reducing method and apparatus.

Another object of the invention is to provide in such an apparatus a closed heat transfer system in the form of an elongated preferably spiral form descending flow path in which process ingredients including iron ore flow in countercurrent relation to upwardly flowing reducing gases, and wherein the cross sectional area of the flow channel within which the process ingredients and reducing gases react is relatively small compared to the overall path length through which the process ingredients flow prior to deposit thereof in the furnace hearth.

Figure 2:

These an other objects and further advantages of the invention will be more readily appreciated upon consideration of the following detailed description and the accompanying drawings, in which:

FIG. 1 is a generally schematic perspective view of an apparatus of the present invention which is operable according to the method of present invention; and FIG. 2 is transverse section of a part of the apparatus of FIG. 1 taken on line II—II of FIG. 1.

There is generally indicated at 10 in FIG. 1 an apparatus according to one presently preferred embodiment of the instant invention and comprised of a rigid fabricated structural framework 12 of steel or the like which extends above a hearth furnace 14 in generally pyramidal form. Frame 12 supports adjacent its upper end a receiving hopper 16, a small bell 18, a large bell 20 and gas uptakes 22 extending upwardly from large bell 20, all of which elements 16,18,20 and 22 are entirely similar to their respective counterparts in a conventional blast furnace.

An inclined guide plate assembly 24 is supported adjacent the upper end of frame 12 directly beneath large bell 20 to receive process materials 25 and guide the same into the inlet end 26 of a spiral pipe 28 which is also supported by frame 12.

Pipe 28 preferably is formed in a generally conical helical form which spirals downwardly within the confines of frame 12 with the spiral turns of the pipe becoming progressively larger as the spiral proceeds down the frame 12 toward hearth furnace 14 through a vertical descent of approximately 100 feet. An outlet end portion 30 of pipe 28 projects through an arched roof portion 32 of furnace 14. The pipe end portion 30 preferably is flared out to an enlarged diameter at the point of penetration through furnace roof 32 as indicated at 34. Pipe 28 preferably is a refractory lined, water-cooled structure as indicated at 29 and is of dimensions to provide a uniform 36 inch free working interior diameter throughout the 240 foot length of the pipe, thus giving a cross sectional area to length ratio of approximately 1/34.

Burners 36 are provided at spaced apart locations along the length of pipe 28 and project within the interior space of pipe 28 in an orientation to direct a blast of burning oxygen and recycle gas upwardly within the pipe 28 toward the upper or inlet end 26 thereof.

To provide the gas mixture for burners 36, any suitable known oxygen supply 38 is provided to supply oxygen via a network of conduits 40 to the burners 36. Similarly, recycle gas is provided to the burners 36 via a network of conduits 42 which deliver the recycle gas from a washer-cleaner 44. Recycle gas is supplied to washer-cleaner 44 via gas uptakes 22 and a connected conduit 46. The conduit networks 42 and 40 also supply the oxygen and recycle gas mixture to one or more roof lances 48 which inject a blast of the burning gas mixture into the hearth furnace 14. A scrap steel hopper 50 and conveying apparatus 52 may also be provided to charge scrap steel into hearth furnace 14.

Structural frame 12 may preferably be enclosed in sheet metal or other suitable siding 54 to enclose and protect the pipe 28 and other components.

The apparatus as above described is used for iron reduction, preferably in a direct steelmaking process similar in many salient respects to the direct steelmaking process described in my prior U.S. Pat. Nos. 4,670,049 and 3,460,934. Accordingly, the entire disclosure of each of my said prior patents is hereby incorporated herein and made a part hereof by reference.

As noted above, the pipe 28 has a clear internal working diameter of 36 inches which extends uniformly throughout its 240 foot length. Further, the pipe 28 has no interior obstructions whatever to impede process material flow. This results in a uniform downward flow of furnace charge materials from the inlet end 26 of the pipe to the outlet end 34.

The process materials charged into the furnace to produce one ton of reduced iron typically will comprise 2 tons of iron ore, 0.9 tons of coke and 0.4 tons of limestone. The charge materials are fed to the inlet hopper 16 and thence via small bell 18 to form a free falling curtain around large bell 20 which is deposited continuously on the inclined guide plate 24 and guided thereby into the inlet end 26 of pipe 28.

The process materials then flow downwardly within pipe 28 to the outlet end 30 thereof and into the hearth furnace 14. While progressing downward through the spiral pipe 28, the process materials are subjected to counterflow contact with hot reducing gases which are guided into spiral pipe and flow upwardly therein. The gases start at an elevated temperature, 3350° F. for example, in the hearth furnace 14, and exhibit progressively reduced temperatures at higher levels within the pipe 28. For example, at the level of the second burner 36 encountered in the flow of reducing gases up the spiral pipe 28, the temperature within the pipe has been measured at 2327° F., and at the level of the next burner 36 encountered in the upward travel of the reducing gases the temperature has been measured at 1730° F. At the top or inlet end of the pipe 28, a temperature of 629° F. has been observed.

The spiral pipe 28 with process materials and reducing gases maintained in counter flow relationship as above described constitutes an elongated closed thermal transfer system of a uniform clear interior cross sectional area throughout its length and in which the working volume is used in a highly efficient manner due to the counter flow relationship of reducing gases and process materials over an elongated path length through which the process materials travel during iron reduction. The pipe 28 as above described develops an effective working volume of 9579 cubic feet. That is, for static conditions the actual diameter of a 240 foot pipe encompassing a 9579 cubic foot volume would be approximately 7.12 feet; however, the effective working volume of my 240 foot pipe is a function not only of pipe dimensions but also the volume and flow rate of reducing gases flowing upwardly therein in counter-flow relation to the flow of process materials. Thus, a 240 foot pipe with an interior diameter of only 36 inches, much smaller than 7.12 feet, will provide in my process the desired effective working volume of 9579 cubic feet. The 36 inch clear interior diameter and 240 foot length are parameters which are suitable to keep temperature of the gases rising from the hearth combustion and upwardly through the spiral pipe at a sufficient elevated temperature to allow the iron reduction process to proceed. With the process materials and reducing gases maintained in counterflow relationship, the effective working volume of the pipe is increased dramatically over the actual volume encompassed by a pipe of the same dimensions.

Another way to characterize the increased effective working volume of the pipe is to note that if the pipe 28 were filled with reducing gases in a static or non-flowing condition, the pipe would have to be much longer to produce the same results in terms of iron reduction brought about by the continuous contact of process materials with the reducing gases throughout their descent in the spiral pipe. Of course, longer pipe would result in a longer residence time for the process materials and considerably reduced economies in the construction and maintenance of the described apparatus.

The reduction of iron ore begins approximately 30 feet down pipe 28 from inlet end 26, and the residence time for the process materials in the pipe over the 240 foot flow path length is 29 minutes. Reduction of the iron ore and other process materials into molten iron and slag occurs entirely within the spiral pipe 28.

The uniform 36 inch inner working diameter of pipe 28 as well as the locations for burners 36 has been selected specifically to keep the reducing gas at a suitably elevated temperature as above noted and further to maintain the proper volume of gases to give the necessary temperature at the top or inlet end 26 of pipe 28. The process materials within the upper reaches of pipe 28 thus quickly become viscous and flow at a high rate down through the pipe. Due to the elongated path of process ingredient movement through the pipe in continuous counterflow contact with the hot reducing gases, the pipe constitutes a closed heat transfer system in which intimate contact between the reducing gases and process materials is continuously maintained and the effective working volume thus is utilized in a highly efficient manner.

Additionally, due to the structure and preferred dimensional parameters of pipe 28, problems pertaining to temperature control do not arise as they do in conventional blast furnaces with their massive volumetric capacity.

Burners 36 provide a simple and easily controlled means of managing and maintaining reducing gas temperature within pipe 28. In addition, oxygen roof lances such as those shown at 48 in the roof of the hearth furnace 14 burn a mixture of recycle gas and oxygen to add to the initial flow of high temperature reduction gases within the lower reaches of pipe 28 adjacent to hearth furnace 14.

In the hearth furnace 14 the combustion of coke or coal produces hot reducing gas constituents, composition of which may include, for example: $CO_2$—20%, CO—58%, $H_2$—18%, $H_2O$—3%, $N_2$—1%. As these reducing gases ascend through pipe 28, the reduction process proceeds. The reducing gases ascend the full length of pipe 28, exiting from inlet end 26 thereof and then passing via uptakes 22 from the bottom of large bell 20 and to a suitable scavenger system including a conduit 46 which delivers the gases from uptakes 22 to a suitable gas washer/cleaner system 44 as above described. The cleansed recycled gases thence are delivered via conduit 42 to the burners 36 and lances 48 as described hereinabove.

With pipe 28 full of the process material mixture and operating on a continuous basis, and a residence time of 29 minutes for the process materials in pipe 28, a continuous steady state flow of process materials for 29 minutes will produce 53 tons of molten iron and 20 tons of slag discharged from the outlet end 30 of pipe 28 and into hearth furnace 14. The production capacity of the system thus is 3650 tons of molten iron and slag per day. For these production rates, oxygen consumption is 2200 cubic feet every 29 minutes or 4.8 tons of oxygen per day.

Upon passing from pipe 28 into hearth furnace 14, the reduced iron preferably is processed in a direct steelmaking operation similar in many salient respects to the similar process described in my above cited prior U.S. Pat. Nos. 4,670,049 and 3,460,934, but without the use of a blast furnace. Specifically, the metallic iron containing reduced substances and the slag containing unreduced substances or oxides flows down from the smelting zone in the upper reaches of pipe 28, which is 30 feet from the top of the pipe 28 where the material becomes viscous, and continues to flow in the pipe the full length thereof over a period of 29 minutes.

At the outlet end 30 of pipe 28 the molten iron and slag emerge and are deposited in the heath furnace 14. At this point the metal and slag each have a composition such as shown in table 1 of my prior U.S. Pat. No. 4,670,049. During the refining period in the hearth furnace 14, temperature is maintained at approximately 3340° F. At this temperature the residual oxygen in the steel reacts with carbon and forms carbon monoxide which gives rise to a boil as it leaves the steel bath and enters the slag. By this boiling action, the oxygen content of the steel is reduced to a value that oxidizers are not required.

The final molten steel and slag in the hearth furnace 14 has a composition such as shown in table II in my above cited prior U.S. Pat. No. 4,670,049. The oxidized and reduced slag leaves the hearth furnace 14 via one or more slag runners 54, and the molten steel is drawn from the furnace 14 via a runner 56.

In accordance with the above description, I have invented a novel and improved method and apparatus for the reduction of iron in the reduction phase of a direct steelmaking process which includes continuous, sequential iron reduction and steel refining processes in an apparatus which is specifically configured for the purpose. I have described the presently preferred best mode of the invention; however, I have also contemplated various alternative and modified embodiments which surely would also readily occur to others versed in the art, once apprised of my invention. Accordingly, the invention is to be construed broadly and limited only by the scope of the claims appended hereto.

I claim:

1. An apparatus for producing reduced molten iron from process materials including iron ore comprising:
    an elongated enclosure means;
    an elongated enclosed flow path extending within said enclosure means and having an inlet end and an outlet end;
    said flow path descending vertically substantially continuously from said inlet end to said outlet end;
    material feed and guide means cooperable with said inlet end to feed a continuous stream of such process materials into said flow path via said inlet end;
    said flow path having a clear working interior space comprised of an elongated uniform cross-sectional area which is coextensive with said flow path continuously throughout the length thereof within said enclosure means; and
    burner means associated with said flow path at intervals along the length thereof and operable to direct a blast of burning process gases in an ascending direction within said clear working interior space.

2. The apparatus as set forth in claim 1 wherein said flow path is a closed thermal transfer means which is open only at said inlet and outlet ends.

3. The apparatus as set forth in claim 2 wherein said enclosure forms a spiral which descends in successive turns with said flow path extending therein in corresponding spiral turns from said inlet end to said outlet end.

4. The apparatus as set forth in claim 3 wherein each of said spiral turns in the vertically descending direction is of larger spiral diameter than the preceding one of said spiral turns.

5. The apparatus as set forth in claim 1 wherein said uniform cross-sectional area is a generally circular area of constant diameter throughout the length of said flow path.

6. The apparatus as set forth in claim 1 wherein the ratio of said cross-sectional area to the length of said flow path is approximately 1/34.

7. The apparatus as set forth in claim 6 wherein at least a portion of said clear working interior area is formed by a cylindrical side wall portion of said enclosure extending continuously in the longitudinal and circumferential directions.

8. The apparatus as set forth in claim 1 additionally including hearth furnace means disposed to receive processed materials including slag and molten iron from said outlet end of said flow path.

9. The apparatus as set forth in claim 8 additionally including scrap feed means for feeding scrap steel into said hearth furnace.

10. The apparatus as set forth in claim 8 additionally including structural means overlying said hearth furnace and supporting said enclosure thereover.

* * * * *